Nov. 10, 1931.　　　　G. MATTA　　　　1,830,847

PISTON

Filed May 15, 1930

George Matta
INVENTOR

Patented Nov. 10, 1931

1,830,847

UNITED STATES PATENT OFFICE

GEORGE MATTA OF BRADDOCK, PENNSYLVANIA

PISTON

Application filed May 15, 1930. Serial No. 452,712.

My invention relates to improvements in pistons. Heretofore so far as I am aware it has been impossible in the operation of gas engines and particularly of the combustion type, to prevent the pistons thereof from pressing more positively or directly against the walls of the cylinder at one point than at an opposite point, occasioning what is colloquially called knocking, and eventually causing the cylinder to assume in cross sectional dimension a slightly elliptical configuration, making is difficult to maintain efficient compression within the cylinder.

The object of the present invention is to produce a piston, the use of which will overcome this difficulty.

I accomplish this object by means of the device hereinafter more specifically described, reference being had to the accompanying drawings forming part hereof, in which Fig. 1 is a plan view.

Figure 1:
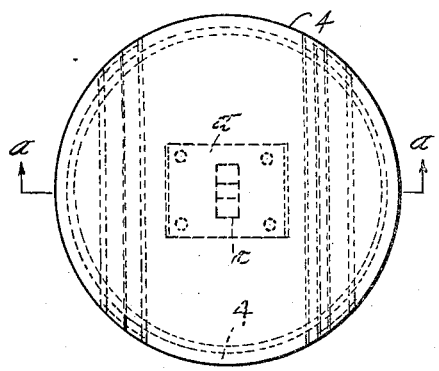
Figure 2:
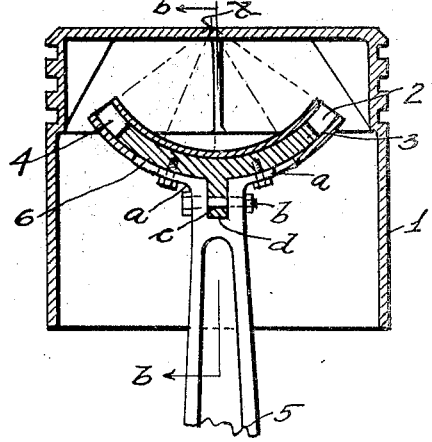
Fig. 2 is a section on line $a$—$a$ of Fig. 1.
Figure 3:
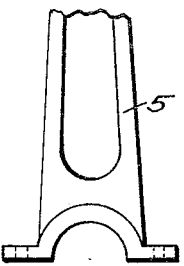
Fig. 3 is a section on line $b$—$b$ of Fig. 2.
Figure 3:
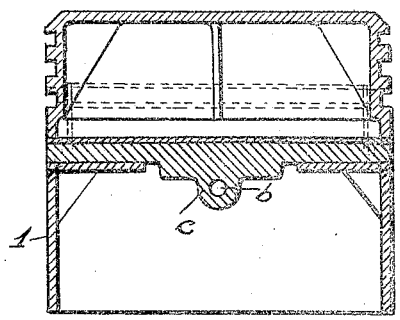
Figure 4:
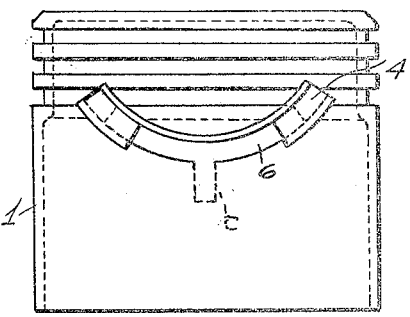
Fig. 4 is a side elevation showing more fully the segmental slot, the bushing therein and the segmental sliding piston bar seated in said bushing.

Referring to said drawings: 1 is a piston head in the side walls of which at opposite sides is formed or cut out the segmental groove 2, in which the ends of the segmental bushing 3 are secured, the said bushing having a slot 4 at the center thereof, in which the connecting rod 5 is adapted to swing. The said connecting bar at its upper ends having lateral projecting flanges $a$ which are secured to the segmental sliding bar 6 seated in the segmental bushing by means of the bolts $b$. The said segmental bar having a downwardly projecting lug $c$ which is secured in the slot $d$ by means of said bolt $b$. It will be noted that the segmental slot and bushing seated therein constitute the upper bearing for said connecting rod and that said slot is projected on a radius from a point $x$ as indicated by the dotted lines and that said point $x$ is slightly below the top elevation line of the piston so that the connecting rod in its movement acts as if it were pivotally connected at such point, ensuring a perfectly vertical movement of the piston, thus avoiding any tendency to impinge or connect more toward one side of the cylinder than the other, thus preventing the difficulties heretofore herein mentioned.

Having described my invention, what I claim and desire to secure by Letters Patent is:

1. A piston having a segmental slot cut in the walls thereof at opposite sides, a bushing secured in said slot, and a segmental bar seated in said bushing, the said bushing having a slot therein at the center thereof.

2. A piston having a segmental slot cut in the walls thereof at opposite sides, a bushing secured in said segmental slot, and a segmental bar seated in said bushing, a connecting rod, and means for connecting said rod to said segmental bar.

In testimony whereof, I have hereunto signed my name.

GEORGE MATTA.